119,227

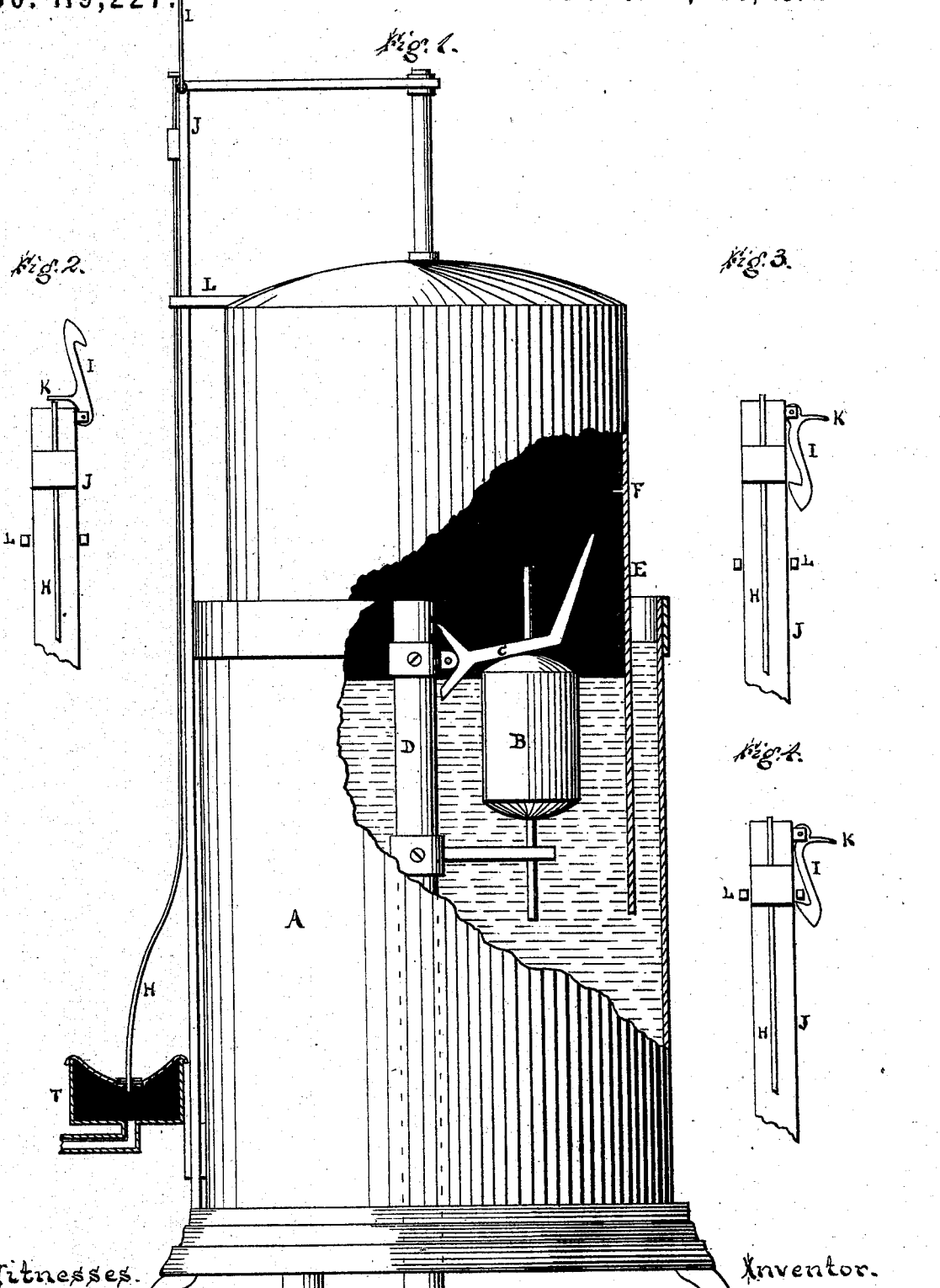

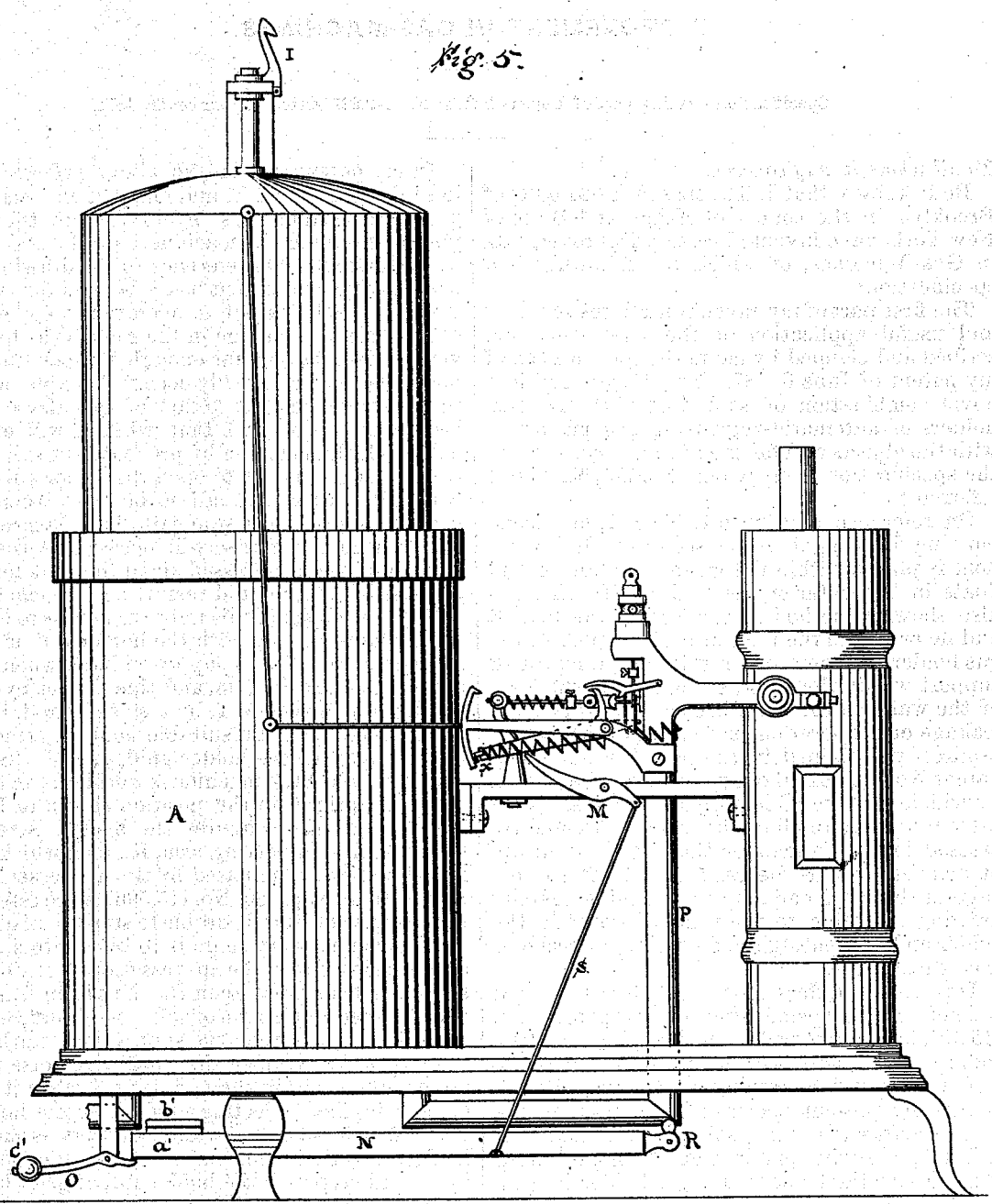

UNITED STATES PATENT OFFICE.

THOMAS B. FOGARTY, OF BROOKLYN, NEW YORK.

IMPROVEMENT IN GAS-MACHINES.

Specification forming part of Letters Patent No. 119,227, dated September 26, 1871.

*To all whom it may concern:*

Be it known that I, THOMAS B. FOGARTY, of Brooklyn, in the county of Kings and State of New York, have invented certain Improvements in Gas-Machines, of which the following is a specification:

The first part of my invention relates to a new and useful application of the safety-float described and claimed by me in the specification of my patent of June 6, 1871, No. 115,591, and in a novel combination of said float with the gas-holders of automatic-regulating gas-machines, with the objects and for the purposes set forth in the specification of my patent No. 115,591, above referred to.

On reference to Figure 1, Sheet 1, of accompanying drawing, it will be seen that the safety-float is placed within the gas-holder tank A and floats in the water of the tank itself. There is also shown a method of connecting the float B and lever C with the inlet or outlet-pipe D of the gas-holder, or some other suitable standard or support within the tank, so that when the level of the water in the tank becomes lowered from leakage or evaporation, or from any other cause, as already explained in the specification of my patent No. 115,591, above referred to, the float B by which the lever C is supported will fall with the water, so as to allow the lever to become depressed in such a manner that its end will approach the sides of the gas-holder E so as to engage in the pin F and stop the machine, thereby drawing attention to the want of water in the holder and preventing the possibility of accident from this source.

This device differs from that described and claimed in the specification of my patent No. 115,591, before referred to, in which I claim a secondary tank placed within or without the gas-holder tank, and containing a float, &c., whereas in this my present specification I disclaim the subject-matter of my aforesaid patent No. 115,591, and claim only the combination of the gas-holder tank A with the lever C and gas-holder E, substantially as set forth.

The second part of my invention relates to a new and useful application of the air-vessel T described by me in my patent of June 6, 1871, No. 115,596, and a novel combination of said air-vessel with the gas-holders of automatic-regulating gas-machines; and its object is to facilitate the relighting and starting of such machines.

In my patent No. 115,596 above referred to I describe the vessel T, and claim it in combination with certain rods, levers, &c., for the purpose of stopping the machine, as fully described in said patent. On reference to the drawing accompanying said patent it will be seen that when the air-vessel T is put in operation the end *o* of the lever N will engage in the rod S so as to prevent it from falling far enough to open the vapor-valve, as has already been fully explained in said patent; but the action of this device has been found to be such that, while it will effectually lock the machine by preventing the holder from falling so far as to open the vapor-valve, it will still permit it to fall so far that, when the machine stops, it will stop with the holder nearly empty, which of course will necessitate the use of some of the compressed air in the tank for the purpose of heating and restarting the machine.

Now, the object of this improvement is to cause the machine to stop with the holder full of gas, so that there will be a supply on hand when it is desired to start it again, and this I effect by connecting the air-vessel T, by a suitable rod, H, or lever, or both, with a suitable hook, I, attached to the top of the gas-holder guide-post J; (Sheet 1.) Now, when the machine is working, the hook I stands upright, in the position shown in Figs. 1 and 2. In these figures the hook I is represented with a projecting arm, K, upon which the rod H acts when actuated by the air-vessel T, as described in my patent No. 115,596 before referred to. Now, when it is desirable to stop the machine all that is necessary to do is to blow into a suitable pipe leading to the air-vessel, or by any other suitable means press upon the air within it, so as to inflate the diaphragm of said vessel sufficiently to cause it to act upon the spur K upon the hook I, so as to throw down the hook and cause it to assume the position shown in Fig. 3, when it will engage in the projecting guide L of the holder when next it rises, and will lock it fast, as shown in Fig. 4, so that when the machine stops working it will stop with the holder full of gas wherewith to heat it up and start it next time. It is evident that a suitable lever may be substituted for the rod H, or may be combined with it, or a bell-wire or cord may be made to actuate I, as shown in my patent No. 115,596, before referred to, and thus supersede the air-vessel T altogether; or this vessel may be furnished with a suitable stop-cock upon its connecting-pipe, so that by inflating the diaphragm and closing the stop-cock the pressure of the confined air will retain the hook I in its upright position; but as soon as the stop-cock is opened and the contained air is allowed to escape the diaphragm will collapse and the hook will fall into the position shown in Figs. 3 and 4. In a word, the air-vessel may be made to effect the object desired either by positive or negative action—positive action when the inflation of the diaphragm is caused to act upon the hook so as to throw it down; negative action when the inflation of the diaphragm is made to retain the hook in the position shown in Figs. 1 and 2—and the escape of the air and consequent collapse of the diaphragm will cause it to fall into the position shown in Figs. 3 and 4. It is evident, too, that the air-vessel may be placed on the top of the holder, and, being connected with a flexible tube, may be made to cause a suitable hook attached to the holder itself to engage in the guide-post when the holder becomes full; or it may be made to cause a suitable lever attached to the side of the holder-tank to fall against the side of the holder itself so as to engage in a suitable projection upon its side, so as to lock it fast whenever it becomes filled next after said hook being thrown into action, as described.

I do not claim the above-described devices for the purpose of stopping a gas-machine, inasmuch as they have been already described in my patent No. 115,596, before referred to; but I claim them for the purpose of stopping a gas-machine after a particular manner—that is, with the holder full of gas—substantially as described.

The third part of my invention relates to a new and useful application of the lever K described in my patent of June 6, 1871, No. 115,597, and to a novel method of operating the same; and its object is to insure more safety to automatic-regulating gas-machines, such as described in said patent, by rendering the action of said lever more certain and decided.

In my patent No. 115,597, before referred to, I describe a method of operating a lever, K, by the weight of the gas-holder, when from any cause the heat under the retort becomes inadequate to a sufficient supply of vapor; but it is found that although the weight of the holder will operate this lever as described, and with absolute certainty, its action is yet too slow, so that a large quantity of gasoline will flow over. This is a serious defect, and to remedy it I have devised the lever M, shown on Sheet 2 of drawing attached to this specification, and the drip N and trigger O, also shown in said sheet, and have arranged them so that the very weight of the liquid which runs over will operate to close the vapor-valve and stop the machine. For this purpose I attach the drip N to the inlet-pipe P by the swing-joint R, and also connect N to the lever M by a rod or cord or chain, as shown. An inspection of the drawing will now show that, by bearing down on the end $a'$ of N with sufficient weight, the lever M will be acted on by means of the connecting-rod so as to cause it to throw up the vapor-valve lever and close the valve. I therefore load the end $a'$ with weights $b'$ sufficient to throw up the vapor-valve X even against the weight of the gas-holder, and at the same time support N by the weighted trigger O, upon which I adjust the weight $c'$, so that O will support N upon its shorter end; but any addition of weight to N will cause it to overcome the resistance of O and to fall so as to actuate the lever M by pressing on the rod S, and to close the vapor-valve even against the pressure of the gas-holder. It is evident that the equilibrium of the weights $b'$ and $c'$ can be easily adjusted, so that, as soon as gasoline begins to flow over into N through the swing-joint R, the weight of a small portion will be sufficient to destroy the balance between O and N so as to release N and allow it to act upon the lever M, and through it on the vapor-valve lever X. It will be perceived, too, that the weight of the gasoline which runs over is not relied on to close the vapor-valve, but merely to destroy the equilibrium between N and O so as to release O; consequently, N may be weighted sufficiently to give it all the power desired, and O will serve merely as a retainer to keep it in position until the equilibrium between them is destroyed by the weight of the small portion of liquid that enters N.

Sheet 1, Figure 1, is an end elevation of the gas-holder of an automatic-regulating gas-machine, and this and the other figures on the same sheet are designed to illustrate the first and second parts of my invention. Sheet 2 is a side elevation of an automatic-regulating gas-machine, and is designed specially to show the nature of the third part of my invention.

Upon both sheets and in all the figures the same letters refer to the same parts.

I claim—

1. The float B, constructed and operated substantially as set forth, in combination with the gas-holder tank A, substantially as set forth.

2. The combination of the float B, lever C, and holder E, constructed and operated substantially as set forth.

3. The combination of the air-vessel T and hook I, constructed and operated substantially as set forth.

4. The combination of the air-vessel T and holder E, constructed and operated substantially as set forth.

5. The drip-pipe and levers O and M, constructed and operated substantially as set forth.

THOS. B. FOGARTY.

Witnesses:
GEO. S. WILLIAMS,
CONRAD J. BECKER.

(39)